May 27, 1924.
J. C. MERRITT
AUTOMATIC TRUCK BRAKE
Filed Oct. 14, 1922
1,495,919
2 Sheets-Sheet 1
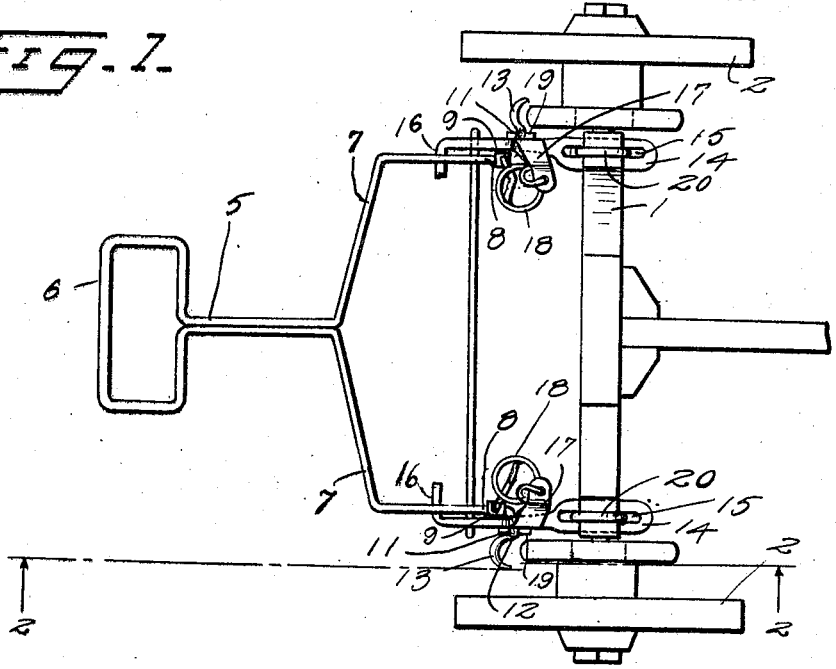
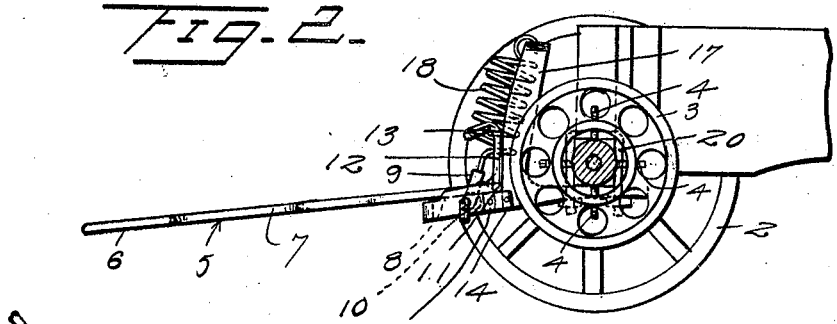
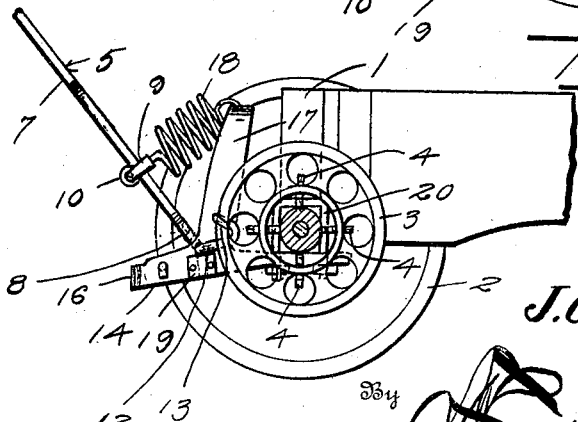
Inventor
J.C. Merritt May 27, 1924.

J. C. MERRITT

AUTOMATIC TRUCK BRAKE

Filed Oct. 14, 1922

Inventor
J. C. Merritt.

By
Attorney

Patented May 27, 1924.

1,495,919

UNITED STATES PATENT OFFICE.

JACOB C. MERRITT, OF ROSCOE, NEW YORK.

AUTOMATIC TRUCK BRAKE.

Application filed October 14, 1922. Serial No. 594,542.

*To all whom it may concern:*

Be it known that I, JACOB C. MERRITT, a citizen of the United States, residing at Roscoe, in the county of Sullivan and State of New York, have invented certain new and useful Improvements in an Automatic Truck Brake; and I do hereby declare the following to be a full, clear, and exact description of the invention, such as will enable others skilled in the art to which it appertains to make and use the same.

This invention relates to baggage trucks and more particularly to a brake mechanism therefor associated with the handle or tongue and the front wheels.

It is desirable to prevent movement of baggage trucks when left unattended and it is not always convenient to chock the same, hence in accordance with the present invention a brake mechanism is provided and is automatically actuated, being applied when the truck is left unattended and released when the truck is under control of an attendant.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of the front portion of a truck embodying the invention, the platform being omitted, Figure 2 is a sectional detail on the line 2—2 of Figure 1, the tongue being lowered and the brake released, Figure 3 is a view similar to Figure 2, the tongue being elevated and the brake applied.

Corresponding and like parts are referred to in the following description and designated in the several views of the drawings by like reference characters.

Figure 4:
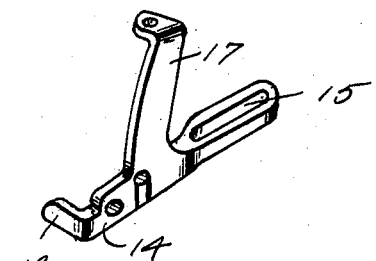
Figure 4 is a detail perspective view of one of the tongue couplers.
Figure 5:
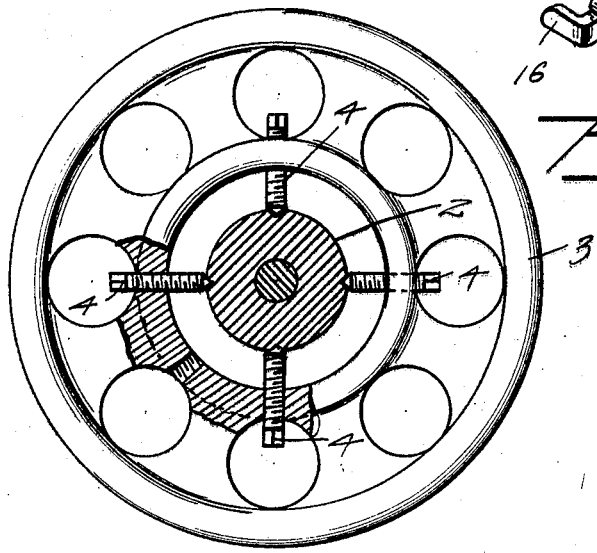
Figure 5 is a detail view of a brake wheel.
Figure 6:
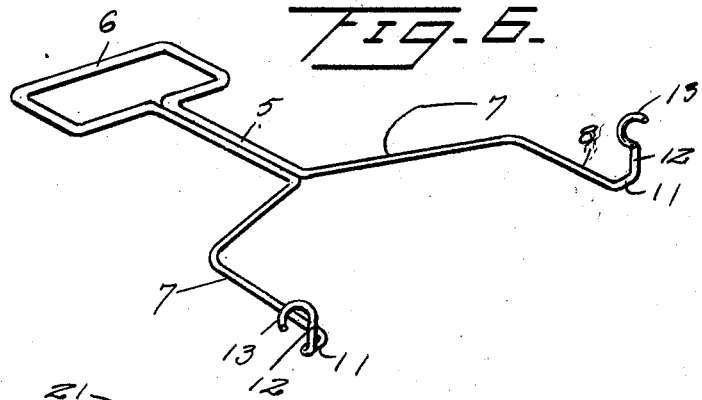
Figure 6 is a detail perspective view of the tongue or handle.

The invention is designed for a four-wheel truck such as generally used for moving baggage and merchandise about railway stations and express offices. The accompanying drawings illustrate so much of the front portion of the running gear as is necessary to illustrate the application of the invention. The numeral 1 designates the front axle of the truck and 2 the wheels applied to the spindles thereof. Brake wheels 3 are connected to the wheels 2 so as to rotate therewith, the same being attached to the inner ends of the hub by means of screws 4.

The tongue or handle 5 is provided at its front end with a grip 6 and at its inner end with branches 7 from which arms 8 extend rearwardly. The arms 8 have outwardly disposed journals 11 from the outer ends of which arms 12 extend upwardly and terminate in brake elements 13 which are adapted to cooperate with the respective brake wheels 3.

Similar couplers pivotally connect the tongue or handle to the front axle 1. Each of these couplers consists of a short bar 14 having a longitudinal slot 15 and a lateral extension 16 forming a stop to limit the downward movement of the tongue when lowered. An arm 17 extends upwardly from the bar 14 and a contractile helical spring 18 connects the upper end of the arm 17 with the adjacent arm 8 of the tongue. The lower ends of the springs 18 each connect with a yoke 9 carrying a grooved wheel 10 which slidably engages the respective arms 8 so as to slide thereon as the outer end of the tongue 5 is raised or lowered. The springs 18 normally exert an upward pull on the arms 8 whereby to elevate the outer end of the tongue 5 when released. The springs 18 also serve to apply the brakes. The journals 11 obtain bearings in the bars 14 and are retained in place by means of cap plates 19. Clips 20 adjustably connect the tongue couplers to the axle 1 and pass through the longitudinal slots 15 of the coupler. By having the couplers adjustably connected with the axle, the position of the tongue may be regulated when adapting the invention to a truck so as to avoid interference with the pivotal movements of the tongue and insure application of the brake when the outer end of the tongue is elevated. The brake elements 13 are of such form as to embrace the peripheral edge portion of the brake wheels.

Figure 7:
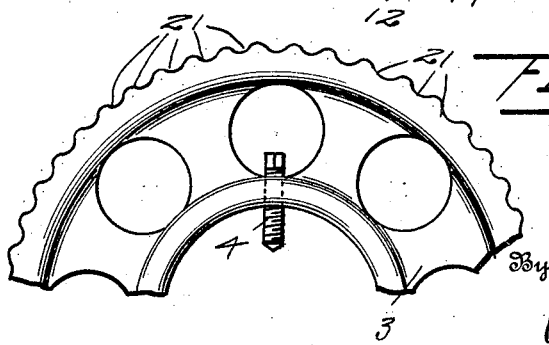
Figure 7 is a detail view showing a modified form of brake wheel.

When the brake is to be applied in a positive manner so as to lock the wheels 2 and hold the truck on a grade, the outer edge of the brake wheel will be provided with a plurality of notches 21 as indicated in Figure 7, to receive the brake elements 13.

What is claimed is:—

1. In a truck, brake wheels rotatable with the wheels thereof, a tongue having pivotal connection with the truck, brake elements carried by the tongue and adapted to engage said brake wheels, and contractile helical springs having sliding engagement with the tongue and normally tending to elevate the outer end of the tongue and apply the brakes.

2. In a truck, brake wheels rotatable with the wheels of the truck, short bars coupled to the axle of the truck, arms extending upwardly from the short bars, a tongue having pivotal connection with the short bars, brake elements carried by the tongue and adapted to engage the brake wheels, and helical springs connected at one end to said arms and having the opposite ends slidably engaging the tongue.

3. In a truck, brake wheels rotatable with the wheels of the truck, short bars having adjustable connection with the axle of the truck and having upstanding arms, a tongue including branches having ends journaled in said bars respectively, contractile helical springs having one end connected to said upwardly extending arms and having the other ends carrying rollers slidably engaging the under side of the respective branches of the tongue, and the terminal portions of the branches being bent to form brake elements to engage said brake wheels.

4. In a truck, short bars secured to the axle of the truck and having upstanding arms, a tongue including branches bent laterally adjacent their free ends to provide journals to pivot the tongue to said short bars forwardly of the axle, said branches being bent beyond said journals to form brake elements, and contractile helical springs having one end connected to said upstanding arms and extending forwardly of the truck and having the other ends slidably engaging the respective branches of the tongue.

In testimony whereof I affix my signature in presence of two witnesses.

JACOB C. MERRITT.

Witnesses:
PETER J. MENGES,
JOS. D. PAMMER.